(12) United States Patent
Ramlaoui et al.

(10) Patent No.: US 8,272,595 B2
(45) Date of Patent: Sep. 25, 2012

(54) FAN COWL SUPPORT FOR A TURBOFAN ENGINE

(75) Inventors: Jihad I. Ramlaoui, Chula Vista, CA (US); Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 254 days.

(21) Appl. No.: 12/626,749

(22) Filed: Nov. 27, 2009

(65) Prior Publication Data
US 2011/0127367 A1 Jun. 2, 2011

(51) Int. Cl.
*B64D 27/10* (2006.01)
(52) U.S. Cl. ......... 244/54; 244/53 R; 60/226.2; 248/554
(58) Field of Classification Search ................ 244/53 R, 244/54; 60/226.2; 248/554
See application file for complete search history.

(56) References Cited

U.S. PATENT DOCUMENTS

| | | | |
|---|---|---|---|
| 3,809,340 A | 5/1974 | Dolgy et al. | |
| 5,203,525 A | 4/1993 | Remlaoui | |
| 5,303,508 A | 4/1994 | Porte | |
| 5,350,136 A | 9/1994 | Prosser et al. | |
| 6,334,588 B1 | 1/2002 | Porte | |
| 6,622,963 B1 | 9/2003 | Ahrendt et al. | |
| 2006/0038066 A1 | 2/2006 | Udall et al. | |
| 2006/0219841 A1* | 10/2006 | Dron et al. | 244/54 |
| 2008/0067287 A1* | 3/2008 | Guibert et al. | 244/54 |
| 2008/0073461 A1* | 3/2008 | Guibert et al. | 244/54 |
| 2009/0189014 A1* | 7/2009 | Balk | 244/54 |

OTHER PUBLICATIONS

Official Action for U.S. Appl. No. 12/695,276, dated Jun. 25, 2012, 8 pgs.

* cited by examiner

*Primary Examiner* — Timothy D Collins
*Assistant Examiner* — Nicholas McFall
(74) *Attorney, Agent, or Firm* — Womble Carlyle Sandridge & Rice, LLP (57) ABSTRACT

A fan cowl support for an aircraft having an engine pylon, an engine fan case and an engine fan cowl. The fan cowl support includes a support having a forward end connected to the engine fan case and an aft end connected to the engine pylon. At least a portion of the engine fan cowl is connected to the support.

19 Claims, 7 Drawing Sheets

FAN COWL SUPPORT FOR A TURBOFAN ENGINE

TECHNICAL AREA

The invention relates to aircraft engines, and more particularly relates to an apparatus and method for supporting a portion of a nacelle on a turbofan engine installed on an aircraft.

BACKGROUND

Figure 1:
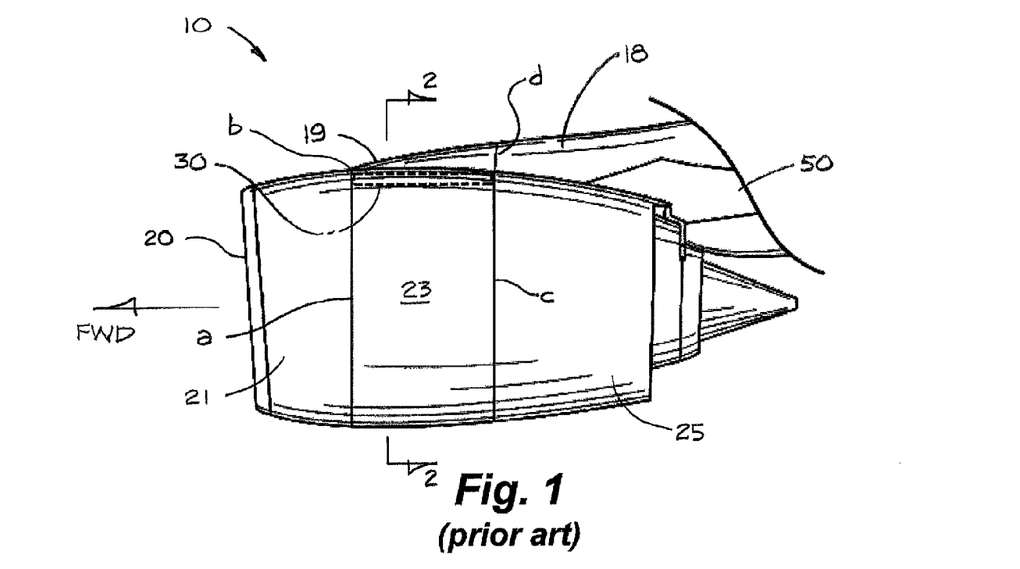
FIG. 1 is a perspective view of a prior art turbofan engine and engine pylon.

As shown in FIG. 1, a turbofan engine 10 is typically attached to an aircraft 12 by an engine pylon 50. The engine 10 includes a nacelle 20 which can include an inlet portion 21, a fan cowl portion 23 and a thrust reverser portion 25. As shown in FIG. 1, the pylon 50 can be covered by one or more aerodynamically shaped fairings 18. A forward-most portion of the fairing 19 that is proximate to the fan case portion 23 of the nacelle 20 is sometimes referred to as a "thumbnail" fairing due to its thumbnail-like shape. The thumbnail fairing 19 provides an aerodynamic transition between the nacelle 20 and the pylon fairings 18.

Figure 2:
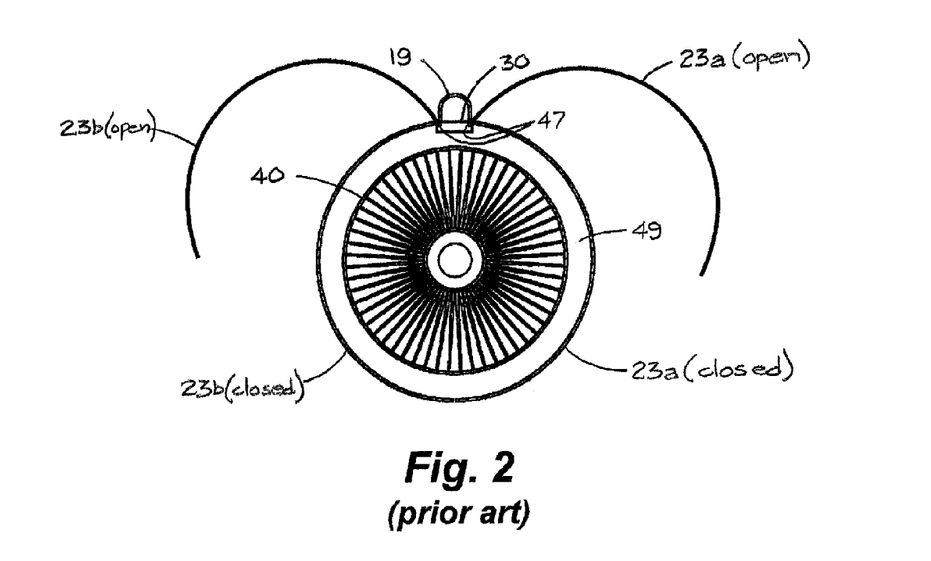
FIG. 2 is a cross-sectional view of the turbofan engine shown in FIG. 1 taken along section line 2-2 in FIG. 1.

As shown in FIG. 2, the fan cowl portion 23 of the nacelle 20 can include two fan cowl doors 23a, 23b disposed on opposite sides of the engine 10 and the fan case 40. When the fan cowl doors 23a, 23b are in their closed positions, the doors 23a, 23b and fan case 40 define an enclosed annular region 49 around the fan case 40. As also shown in FIG. 2, the fan cowl doors 23a, 23b can be upwardly pivoted to their open positions in order to provide access to the fan case 40 and other engine components (not shown) located within the annular region 49. As shown schematically in FIG. 2, the fan cowl doors 23a, 23b can be pivotally attached to opposite sides of a fan cowl support 30 by one or more hinges 47. As shown in FIGS. 1 and 2, the fan cowl support 30 is typically positioned above the fan case 40 and forward of the pylon 50, and can be substantially coextensive with the width of the fan cowl 23. As also shown in FIGS. 1 and 2, a thumbnail fairing 19 can be assembled over the fan cowl support 30.

Figure 3:
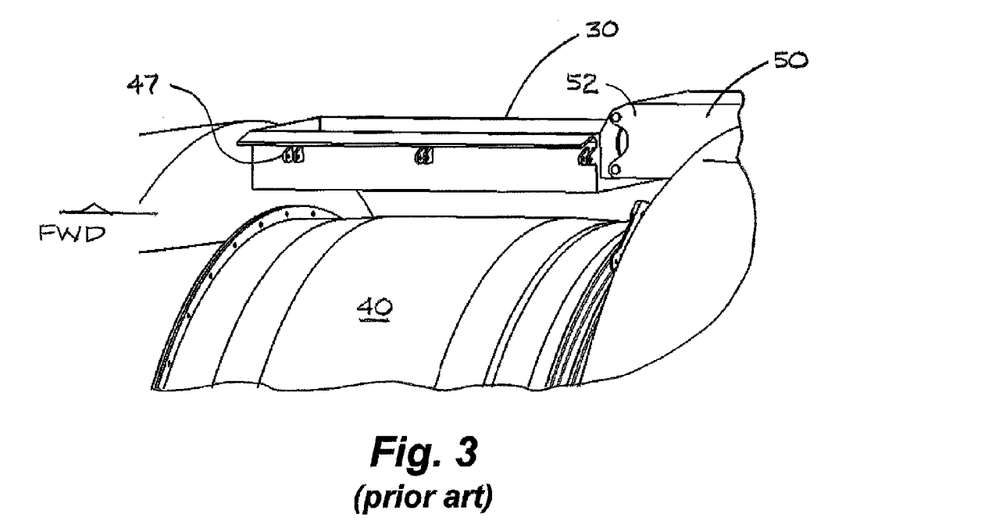
FIG. 3 is a perspective view of a first prior art fan cowl support system.
Figure 4:
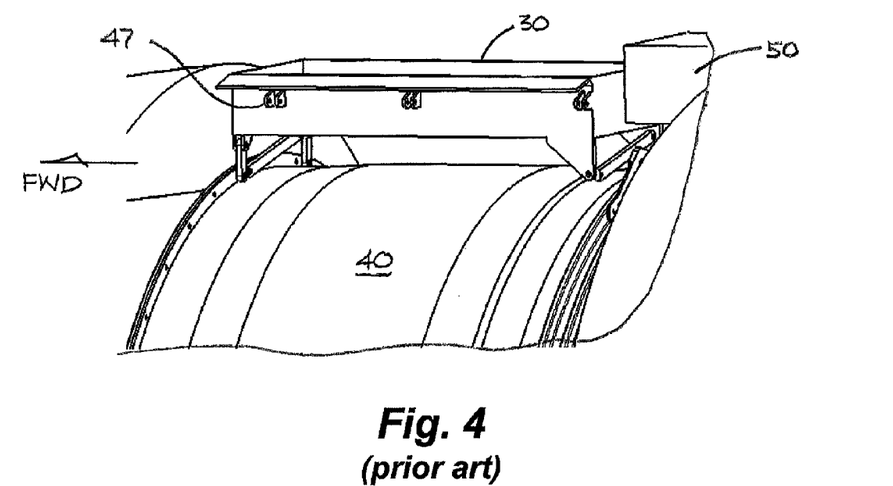
FIG. 4 is a perspective view of a second prior art fan cowl support system.

As shown in FIG. 3, in one prior art arrangement, the fan cowl support 30 is attached to and fully supported by a forward portion 52 of the engine pylon 50 in a forwardly extending cantilevered arrangement. In such an arrangement, the fan cowl support 30 is not connected to or otherwise supported by any portion of an engine fan case 40. Due to its elongated shape and cantilevered arrangement, such a fan cowl support 30 is sometimes referred to as a "diving board." As shown in FIG. 4, in another prior art arrangement, the fan cowl support 30 is attached to and fully supported by an underlying fan case 40. In such an arrangement, the fan cowl support 30 is not connected to or otherwise supported by any portion of an engine pylon 50. As shown in FIGS. 3 and 4, the sides of the fan cowl support 30 can include a plurality of spaced hinges 47 for pivotally connecting the fan cowl doors 23a, 23b (shown in FIG. 2) to the fan cowl support.

Because fan cowl supports 30 previously have been attached either only to an engine pylon 50 or only to an engine fan case 40, relative movements between the pylon 50 and fan case 40 which can occur during aircraft operation can cause relative movements between cowls and/or fairings that are attached to the fan cowl support 30, fan case 40 and/or pylon 50. Such relative movements can cause gaps to temporarily form between adjacent cowls and/or fairings. For example, as indicated in FIG. 1, gaps can form between the nacelle inlet 21 and the fan cowl 23 at region "a," between the nacelle inlet 21 and the thumbnail fairing 19 at region "b," between the fan cowl 23 and the thrust reverser section 25 of the nacelle 20 at region "c," and between the thumbnail fairing 19 and the pylon fairing 18 at region "d." When such gaps are sufficiently large, the gaps may interfere with desired air flow patterns around the nacelle 20 and the pylon 50 if left unsealed. Accordingly, special seals can be required along junctures between adjacent cowl sections and/or fairings that are prone to such gaps in order to ensure that substantial gaps do not form and that desired air flow patterns are maintained. Such sealing solutions can be complex and expensive to implement.

Therefore, there is a need for a fan cowl support system and a method of supporting a fan cowl on a turbofan engine that minimizes relative movements between nacelle cowls and/or pylon fairings, and which reduces or substantially eliminates the need for complex sealing arrangements along joints between adjacent fan cowl sections and/or fairings.

SUMMARY OF THE INVENTION

In one embodiment, the invention includes a fan cowl support for an aircraft having an engine pylon, an engine fan case and an engine fan cowl. The fan cowl support can include a support having a forward end connected to the engine fan case and an aft end connected to the engine pylon. At least a portion of the engine fan cowl is connected to the support.

In another embodiment, the invention includes a fan cowl assembly for a turbofan engine of a type attached to an aircraft by a pylon having a front portion and having a fan case including a forward portion that extends forward of the front portion of the pylon. The fan cowl assembly can include a support having a forward end and an aft end, at least one aft connector adapted to connect the aft end of the support to the front portion of the pylon; and at least one forward connector adapted to connect the forward end of the support to the forward portion of the fan case.

In a further embodiment, the invention includes a method of supporting a portion of a fan cowl on an aircraft having an engine pylon and a turbofan engine including a fan case. The method can include providing a fan cowl support having a forward end and an aft end and connecting the aft end of the support to the engine pylon. The method can also include connecting the forward end of the support to the fan case and connecting the portion of the fan cowl to the support.

These and other aspects and features of the invention will be understood from a reading of the following detailed description together with the drawings.

DESCRIPTION

Figure 5:
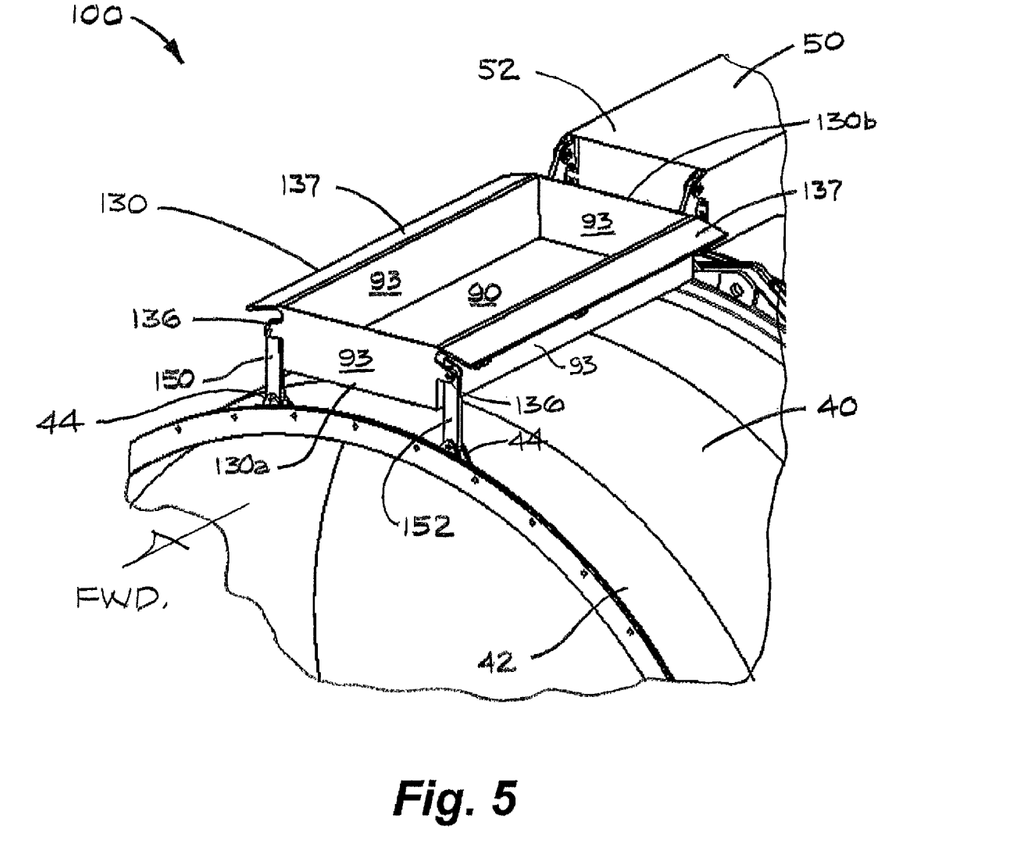
FIG. 5 is a perspective view of one embodiment of a fan cowl support assembly according to the invention.

One embodiment of a fan cowl support assembly 100 for a turbofan engine according to the invention is shown in FIG. 5. In this embodiment, the fan cowl support assembly 100 includes a support 130. As shown in FIG. 5, the support 130 can have an elongated rectilinear shape, though the support 130 can also have other alternative shapes. In the embodiment shown, the support 130 has a tray-like structure including a substantially flat bottom 90 and a plurality of upstanding sidewalls 93. The support 130 can be assembled from a plurality of metal components that are welded or fastened together. Alternatively, the support 130 can be a one-piece casting or forging. Preferably, the support 130 is constructed of a lightweight metal such as composites, aluminum or titanium, for example.

In FIG. 5, the support 130 is shown assembled to an engine pylon 50 of an aircraft and to a fan case 40 of a turbofan engine connected (by means not shown) to the pylon 50. In this arrangement, the support 130 extends forward of a front portion 52 of the pylon 50 and is positioned above the fan case 40. As shown in FIG. 5, a forward end 130a of the support 130 can be connected to a forward portion 42 of the fan case 40 by a pair of forward links 150, 152. More or fewer forward links 150, 152 can also be used. As described in detail below, an aft end 130b of the support 130 can be connected to a front end 52 of the engine pylon 50. As shown in FIG. 5, the support 130 can include opposed side flanges 137 for use in attaching a thumbnail fairing 19 like that shown in FIGS. 1 and 2, for example, to the support 130.

Figure 6:
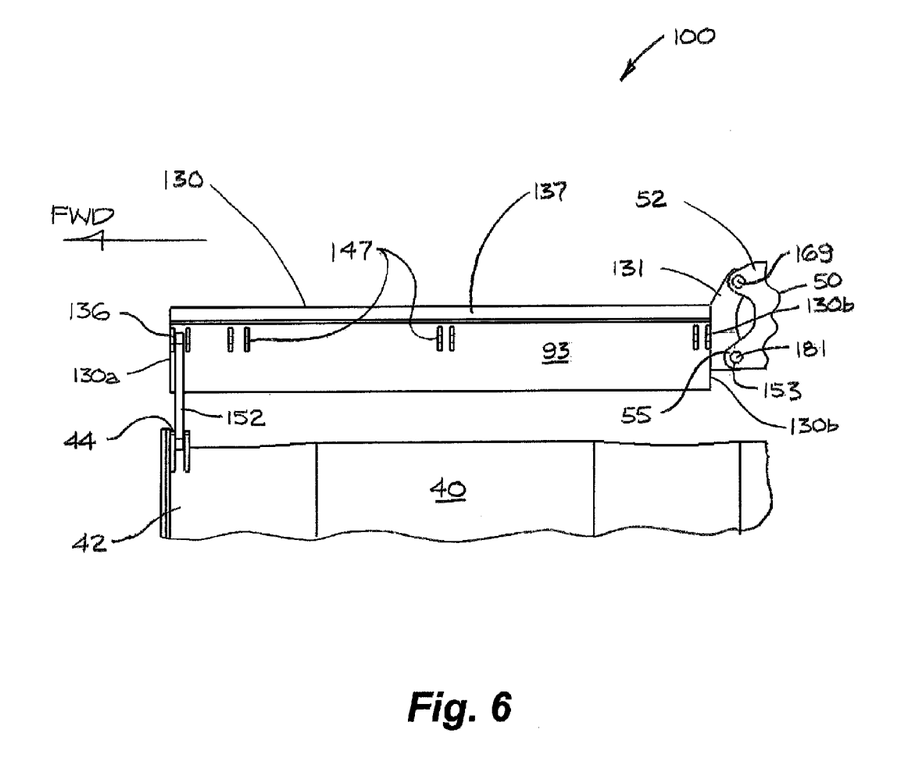
FIG. 6 is a side view of the fan cowl support assembly shown in FIG. 5.
Figure 7:
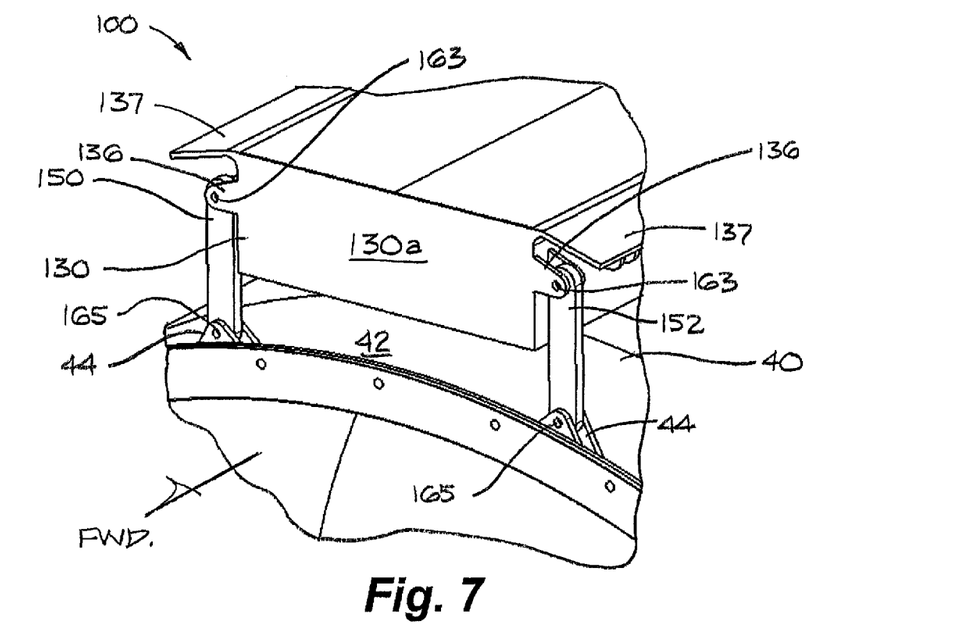
FIG. 7 is a perspective view of a forward portion of the fan cowl support assembly shown in FIG. 5.

As shown in FIGS. 5-7, the forward end 130a of the support 130 can include one or more upper brackets 136 for connecting upper ends of the forward links 150, 152 to the support 130. In addition, the forward portion 42 of the fan case 40 can include one or more lower brackets 44 for connecting lower ends of the forward links 150, 152 to the fan case 40. In the embodiment shown in FIG. 7, the upper ends of the forward links 150, 152 are pivotally connected to the support 130 by upper brackets 136 and upper pins 163, and the lower ends of forward links 150, 152 are pivotally connected to the fan case 40 by lower brackets 44 and lower pins 165. The upper pins 163 and lower pins 165 can be constructed of mild steel, for example. In the embodiment shown, the forward links 150, 152 are free to rotate or pivot relative to the upper brackets 136 and the lower brackets 44. Though not shown in the drawings, the ends of the links 150, 152 can include spherical bearings of a type known in the art to facilitate relative rotation between the links 150, 152 and the upper brackets 136 and the lower brackets 44 and to substantially prevent the transmission of forward/aft loads between the links 150, 152 and the upper brackets 136 and lower brackets 44. In addition, though not shown in the drawings, the pin-receiving openings in the upper brackets 136 and/or lower brackets 44 may include bushings of a type known in the art for wear protection and for clamping engagement with any spherical bearings on the ends of the forward links 150, 152, as needed.

Figure 8:
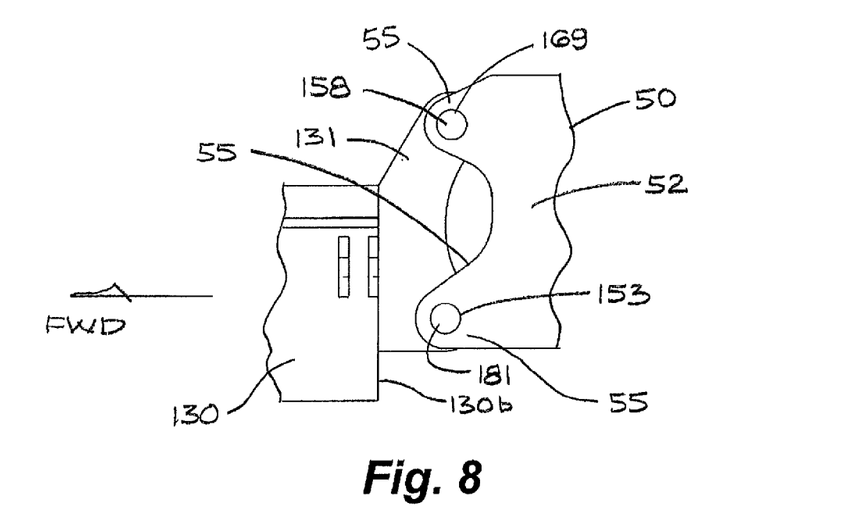
FIG. 8 is a side view showing a connection between an aft portion of a fan cowl support and a forward portion of an engine pylon.
Figure 9:
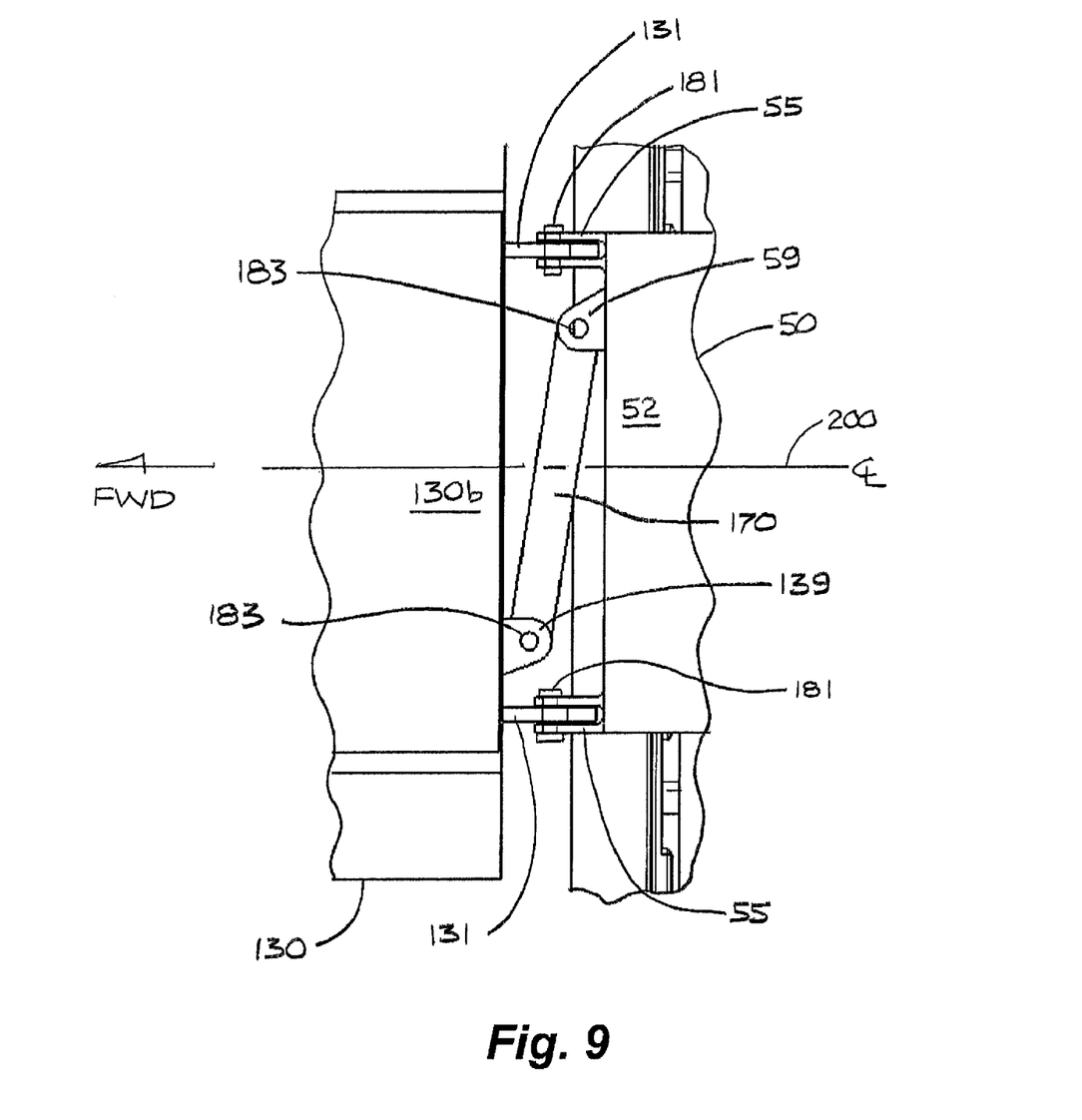
FIG. 9 is a top view showing an aft portion of a fan cowl support assembly according to the invention.

As shown in FIGS. 6, 8 and 9, the aft end 130b of the support 130 can include one or more pivot brackets 131 and the front end 52 of the pylon 50 can include cooperating front brackets 55 for use in connecting the support 130 to the front end 52 of the pylon 50. In the embodiment shown, the aft end 130b of the support is pivotally connected to the front end 52 of the pylon 50 by rear pins 181 that extend through aligned holes 153 in the cooperating pivot brackets 131 and front brackets 55. Though not shown in the drawings, spherical bearings of a type known in the art can be disposed between the pivot brackets 131 and the front brackets 55 to facilitate relative rotation between the brackets 131, 55. In addition, though not shown in the drawings, the pin-receiving openings in the pivot brackets 131 and/or the front brackets 55 may include bushings of a type known in the art for wear protection and/or for clamping engagement with any spherical bearings, as needed.

In the arrangement shown in FIG. 7, the forward links 150, 152, upper brackets 136, lower brackets 44 and pins 163, 165 can be configured to vertically support the forward end 130a of the support 130 and to transmit substantially vertical loads between the support 130 and the fan case 40. In addition, in the arrangement shown in FIG. 8, the pivot brackets 131, front brackets 55 and rear pins 181 can be configured to support the aft end 130b of the support 130 and to transmit substantially vertical loads and substantially fore and aft loads between the support 130 and the pylon 50. As shown in FIG. 9, a transverse link 170 can be provided between the aft end 130b of the support 130 and the forward end 52 of the pylon 50 to transmit substantially lateral loads between the support 130 and the pylon 50. In the embodiment shown in FIG. 9, the front end 52 of the pylon includes a pylon bracket 59 and the aft end 130b of the support 130 includes a transverse link bracket 139. A first end of the transverse link 170 can be pivotally connected to the pylon bracket 59 by a first pin 183, and a second end of the transverse link 170 can be pivotally connected to the transverse link bracket 139 by a second pin 183. As shown in FIG. 9, once the transverse link 170 is assembled as described above, the transverse link 170 extends in a direction that is substantially transverse to a longitudinal axis 200 of the support 130 and pylon 50. Though not shown in the drawings, each end of the transverse link 170 can include a spherical bearing of a type known in the art to facilitate relative rotation between the transverse link 170 and the transverse link bracket 139 and the pylon bracket 59. In addition, though not shown in the drawings, the pin-receiving openings in the transverse link bracket 139 and the pylon bracket 59 may include bushings of a type known in the art for wear protection and/or for clamping engagement with any spherical bearings on the ends of the transverse link 170, as needed.

Once an engine 10 is assembled to an aircraft and the support 130 is connected to the engine pylon 50 and to the fan case 40 as described above, the support 130 relies upon both the pylon 50 and the fan case 40 for stability and support. Accordingly, if the fan case 40 is removed from an aircraft for service or repair, the forward end 130a of the support 130 will lack vertical support and will be free to rotate downwardly about the rear pins 181 unless an alternative means of support is provided. As shown in FIG. 8, temporary ground service equipment ("GSE") pins 158 can be inserted into aligned holes 169 in the front brackets 55 and the pivot brackets 131 to provide such temporary alternative support. The GSE pins 158 can be assembled as shown in FIG. 8 before disconnecting the forward end 130a of the support 130 from the fan case 40 in order to maintain the support 130 in its assembled position (shown in FIG. 6) after the forward end 130a is disconnected from the fan case 40. When both the rear pins 181 and the GSE pins 158 are assembled as shown in FIG. 8, the support 130 forwardly extends from the pylon 50 in a cantilevered arrangement. After the fan case 40 is reinstalled and the forward end 130a of the support 130 is reconnected to the fan case 40 in the manner shown in FIGS. 5-7 and as described above, the GSE pins 158 can be removed to restore the pivoting connection between the support 130 and the pylon 50.

When the support 130 is connected to the pylon 50 and the fan case 40 as described above and as shown in FIGS. 5-9, the forward end 130a of the support 130 must necessarily move with the forward portion 42 of the fan case 40 to which it is connected. In addition, the rear end 130b of the support 130 must necessarily move with the front end 52 of the pylon 50 to which it is connected. Consequently, due to the pivoting connection between the aft end 130b of the fan cowl support 130 and the front end 52 of the engine pylon 50, the support 130 can comply with any relative movements between the front end 52 of the pylon 50 and the front portion 42 of the fan case 40 during operation of an associated engine and aircraft. As a result of such compliant movement of the support 130, any gaps that might otherwise form between cowls and/or fairings that are attached to the support 130 fan case 40 and/or pylon 50 can be minimized or substantially eliminated. For example, estimates indicate that a 50-60 percent reduction in gap sizes might be achieved when compared to corresponding gap sizes associated with prior art fan cowl support systems.

Figure 10:
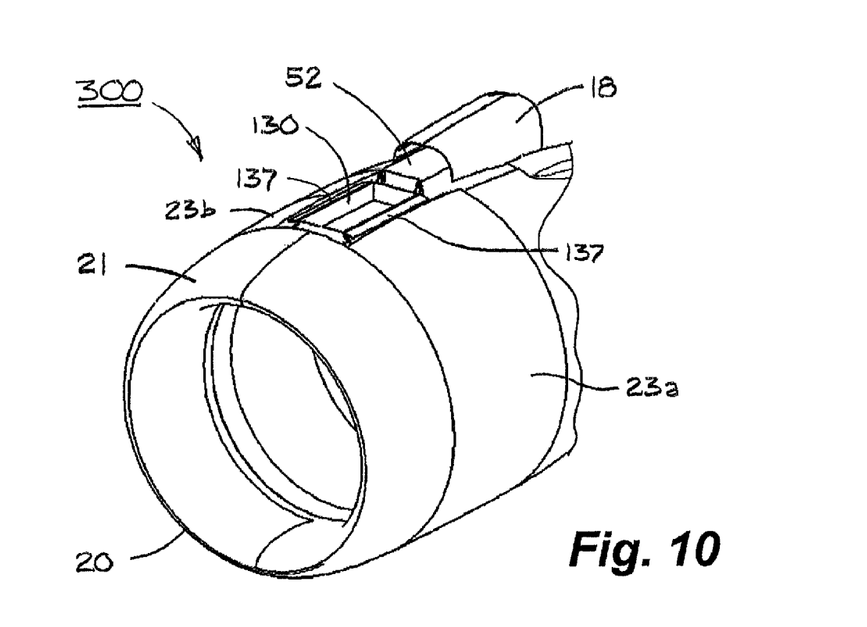
FIG. 10 is a perspective view of an aircraft engine with a fan cowl support assembly according to the invention.
Figure 11:
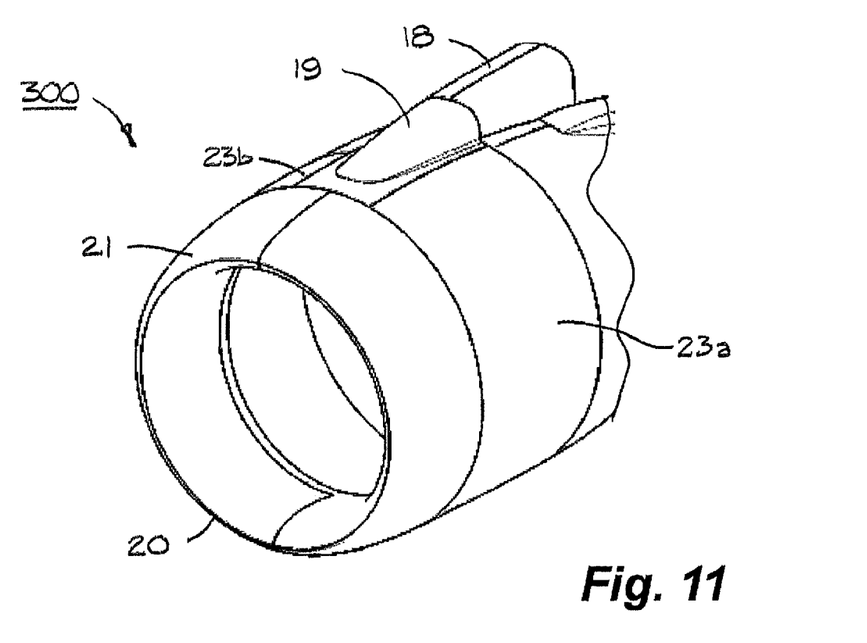
FIG. 11 is a perspective view of the aircraft engine shown in FIG. 10 with a thumbnail fairing installed over the fan cowl support assembly.

The invention also provides a method of supporting a portion of a nacelle 20 on a turbofan engine 10 assembled to an aircraft with an engine pylon 50. The method can include providing a support, such as the support 130 shown in FIGS. 5 and 6, for example. The method can further include connecting an aft end 130b of the support 130 to the engine pylon 50. In one embodiment, the aft end 130b of the support 130 can be connected to the engine pylon 50 in the manner shown in FIGS. 8 and 9, for example. In addition, the method can include connecting a forward end 130a of the support 130 to the engine's fan case 40. In one embodiment, the forward end 130a of the support 130 can be connected to the engine's fan case 40 in the manner shown in FIGS. 5-7, for example. The method can also include connecting a portion of a nacelle to the support. In the embodiment shown in FIG. 10, fan cowl doors 23a, 23b can be pivotally connected to the support 130 in a manner known in the art (such as with hinges 47 as shown schematically in FIG. 2, for example). As shown in FIG. 11, the method can also include attaching a thumbnail fairing 19 to the support 130 (shown in FIG. 10) to cover the support 130 and to provide an aerodynamic transition between the nacelle 20 and the pylon fairing 18.

The above descriptions of various embodiments of the invention are intended to illustrate various aspects and features of the invention, and are not intended to limit the invention to the specifically described embodiments. Persons of ordinary skill in the art will recognize that various changes and modifications can be made to the described embodiments without departing from the scope of the invention. For example, the specific locations and configurations of the various brackets used to assemble the specifically described support 130 to an aircraft may be altered and/or relocated without departing from the scope invention. All such changes and modifications are intended to be within the scope of the appended claims.

What is claimed is:

1. A fan cowl support for an aircraft having an engine pylon, an engine fan case and an engine fan cowl, the fan cowl support comprising
an elongated support with a plurality of surfaces capable of mechanical attachment to other components, the elongated support being separate from a load bearing engine mounting system; and
the elongated support having a forward end pivotally connected to the engine fan case and an aft end connected to the engine pylon, wherein at least a portion of the engine fan cowl is directly connected to the support.

2. The fan cowl support of claim 1 wherein the forward end of the elongated support is pivotally connected to the engine fan case by a plurality of forward links.

3. The fan cowl support of claim 1 wherein the aft end of the elongated support is pivotally connected to a forward end of the engine pylon.

4. The fan cowl support of claim 1 further comprising a transverse link connecting the aft end of the elongated support to the engine pylon.

5. The fan cowl support of claim 1 wherein a first fan cowl door is pivotally attached to a first portion of the elongated support and a second fan cowl door is pivotally connected to a second portion of the elongated support.

6. A fan cowl assembly for a turbofan engine of a type attached to an aircraft by a pylon having a front portion and the engine having a fan case including a forward portion that extends forward of the front portion of the pylon and having a fan cowl covering the fan case, the fan cowl assembly comprising:
a. an elongated support having a forward end and an aft end;
b. at least one aft connector directly attached to the aft end of the support and to the front portion of the pylon;
c. at least one forward connector directly attached to the forward end of the support and to the forward portion of the fan case; and
wherein the support is directly attached to at least a portion of the fan cowl.

7. The fan cowl assembly of claim 6 wherein the forward connector is a link having a first end pivotally connected to the forward end of the support and a second end adapted to be pivotally connected to the forward portion of the fan case.

8. The fan cowl assembly of claim 6 wherein the aft connector is a bracket connected to the aft end of the support, and wherein the bracket is adapted to be pivotally connected to the front portion of the engine pylon.

9. The fan cowl assembly of claim 6 wherein the support has a longitudinal axis extending from the forward end to the aft end, and further comprising a transverse link having a first end pivotally connected to the aft end of the support and a second end adapted to be pivotally connected to the front portion of the pylon, wherein the transverse link extends substantially transverse to the longitudinal axis of the support when the first end is pivotally connected to the aft end of the support and the second end is pivotally connected to the front portion of the pylon.

10. The fan cowl assembly of claim 6 further comprising a first hinge on a first side of the support and a second hinge on a second side of the support, wherein the first and second hinges are each adapted to pivotally connect a fan cowl door to the support.

11. The fan cowl assembly of claim 6 whereby the at least one aft connector can be secured to prevent pivoting of the support relative to the pylon when the at least one forward connector is disconnected from the fan case.

12. The fan cowl assembly of claim 11 whereby the at least one aft connector and the front portion of the pylon have concentric apertures through which a ground service equipment pin can be removably inserted.

13. A method of supporting a portion of a fan cowl on an aircraft having an engine pylon and a turbofan engine including a fan case, the method comprising;

a. providing a fan cowl support having a forward end and an aft end, the fan cowl support being separate from a load bearing engine mounting system
b. connecting the aft end of the support to the engine pylon;
c. pivotally connecting the forward end of the support to the fan case; and
d. directly connecting the portion of the fan cowl to the support.

14. The method of claim 13 wherein connecting the aft end of the support to the engine pylon comprises providing at least one pinned connection between the aft end of the support and the engine pylon.

15. The method of claim 14 wherein connecting the aft end of the support to the engine pylon further comprises providing a transverse link and connecting a first end of the transverse link to the aft end of the support and connecting a second end of the transverse link to the pylon.

16. The method of claim 14 wherein connecting the forward end of the support to the fan case comprises assembling one or more forward links between the forward end of the support and an underlying portion of the fan case.

17. The method of claim 16 wherein a first end of each forward link is pivotally connected to the forward end of the support and a second end of each forward link is pivotally connected to the underlying portion of the fan case.

18. The method of claim 13 wherein connecting the portion of the fan cowl to the support comprises pivotally connecting a first fan cowl door to a first side of the support and pivotally connecting a second fan cowl door to a second side of the support.

19. The method of claim 13 further comprising attaching at least one fairing to the support.

\* \* \* \* \*